United States Patent
Lee et al.

(10) Patent No.: US 8,323,833 B2
(45) Date of Patent: Dec. 4, 2012

(54) ANODE FOR IMPROVING STORAGE PERFORMANCE AT A HIGH TEMPERATURE AND LITHIUM SECONDARY BATTERY COMPRISING THE SAME

(75) Inventors: Yun-Ho Lee, Daejeon (KR); Sunkyu Kim, Gyeonggi-do (KR); Seungdon Choi, Daejeon (KR)

(73) Assignee: LG Chem, Ltd. (KR)

( * ) Notice: Subject to any disclaimer, the term of this patent is extended or adjusted under 35 U.S.C. 154(b) by 284 days.

(21) Appl. No.: 12/309,708

(22) PCT Filed: Jul. 21, 2007

(86) PCT No.: PCT/KR2007/003529
§ 371 (c)(1),
(2), (4) Date: Mar. 10, 2010

(87) PCT Pub. No.: WO2008/013380
PCT Pub. Date: Jan. 31, 2008

(65) Prior Publication Data
US 2010/0159327 A1   Jun. 24, 2010

(30) Foreign Application Priority Data
Jul. 28, 2006   (KR) .................. 10-2006-0071667

(51) Int. Cl.
*H01M 4/50* (2010.01)
*H01M 4/02* (2006.01)

(52) U.S. Cl. ............ 429/231.5; 429/209; 429/212; 429/217; 429/218.1; 429/224; 429/231.8

(58) Field of Classification Search .......... 429/209, 429/217, 224, 231.5, 231.8
See application file for complete search history.

(56) References Cited

U.S. PATENT DOCUMENTS

| | | | |
|---|---|---|---|
| 6,451,482 B1 | 9/2002 | Watanabe et al. | |
| 6,645,673 B2 | 11/2003 | Yamawaki et al. | |
| 2002/0039684 A1 | 4/2002 | Matsubara et al. | |
| 2004/0121234 A1 | 6/2004 | Le | |
| 2005/0191550 A1 | 9/2005 | Satoh et al. | |
| 2006/0003232 A1 | 1/2006 | Jung et al. | |
| 2006/0127773 A1* | 6/2006 | Kawakami et al. | 429/245 |
| 2008/0032192 A1* | 2/2008 | Yokomizo et al. | 429/210 |

FOREIGN PATENT DOCUMENTS

| | | |
|---|---|---|
| EP | 0874410 A2 | 10/1998 |
| EP | 1207572 | 5/2002 |
| EP | 1667255 | 6/2006 |
| JP | 7-153496 A | 6/1995 |
| JP | 10188976 | 7/1998 |
| JP | 2000-302547 A | 10/2000 |
| JP | 2003-132889 A | 5/2003 |
| JP | 2003132888 | 5/2003 |
| JP | 2004206945 | 7/2004 |
| JP | 2006194469 A | 7/2006 |
| KR | 10-2004-0096203 A | 11/2004 |
| KR | 10-2006-0063751 A | 6/2006 |
| KR | 1020070035194 | 3/2007 |
| KR | 10-0739944 | 7/2007 |
| WO | 2005067081 A1 | 7/2005 |
| WO | 2005112180 | 11/2005 |
| WO | WO/2006/008930 * | 1/2006 |
| WO | WO 2006062349 * | 6/2006 |

OTHER PUBLICATIONS http://www.samchemprasandha.com/styrene_butadiene_rubber.html—Attached document under Styrene- Butadiene rubber.*

* cited by examiner

*Primary Examiner* — Patrick Ryan
*Assistant Examiner* — Ladan Mohaddes
(74) *Attorney, Agent, or Firm* — Lerner, David, Littenberg, Krumholz & Mentlik, LLP

(57) ABSTRACT

Provided are an anode for a battery comprising: (a) an anode active material, (b) TiO2, and (c) a styrene-butadiene rubber (SBR), and a lithium secondary battery comprising the same. By using titanium oxide and SBR together with an anode active material as the anode components in the present invention, increase in the anode resistivity during the high-temperature storage and reduction in the battery capacity by the resistivity are inhibited, thereby the overall performances of the battery can be improved.

5 Claims, No Drawings

ANODE FOR IMPROVING STORAGE PERFORMANCE AT A HIGH TEMPERATURE AND LITHIUM SECONDARY BATTERY COMPRISING THE SAME

CROSS REFERENCE TO RELATED APPLICATIONS

The present application is a national phase entry under 35 U.S.C. §371 of International Application No. PCT/KR2007/003529, filed Jul. 21, 2007, published in English, which claims the benefit of Korean Patent Application No. KR10-2006-0071667, filed Jul. 28, 2006. The disclosures of said applications are incorporated by reference herein.

FIELD OF THE INVENTION

The present invention relates to an anode of a battery, which uses a cathode active material in a spinel-type structure, in which the anode can inhibit an increase in anode resistivity generated at a high-temperature storage and reduction in battery capacity due to the anode resistivity, and to a lithium secondary battery comprising the anode for improving storage performance at high temperatures.

BACKGROUND OF THE INVENTION

In recent years, studies on lithium secondary batteries with high energy density have been conducted actively, as the miniaturization and lightweight of electronic devices realized and the use of portable electronic equipments generalized. A lithium secondary battery comprises a cathode and an anode that use materials capable of intercalation/deintercalation of lithium ions, and an organic electrolyte or a polymer electrolyte introduced between the cathode and anode. The lithium secondary battery generates energy by an oxidation and reduction reaction when lithium ions intercalate into and deintercalate from the cathode and anode.

Presently, a cathode active material of a lithium secondary battery known in the art includes lithium-manganese composite oxide together with lithium-cobalt composite oxide. Especially, manganese-based active materials such as $LiMn_2O_4$ and $LiMnO_2$ are advantageous in that the synthesis is easy with a relatively low production cost and small environmental pollution. However, when the lithium-manganese composite oxide for a lithium secondary battery is repeatedly charged and discharged at 40 to 60° C. or stored for a prolonged period, the life of the battery is shortened due to increased battery resistivity (reduction in the power output) and the capacity reduction.

In order to solve the above problems, Japanese Patent Laid-Open Publication No. Hei 7-153496 teaches to add at least one compound selected from the group consisting of BaO, MgO, and CaO to the lithium-manganese composite oxide, and thereby preventing manganese ions from dissolving into an electrolyte of the battery. However, supposedly, it is difficult to solve the above problems sufficiently. And, the side effects such as initial capacity deterioration by adding a nonconductive compound when constituting a high capacity battery are a concern.

SUMMARY OF THE INVENTION

Therefore, the present invention has been made in view of solving the problems of the conventional arts and solving the technical problems that have yet to be resolved.

The present inventors have predicted that a reduction in the charge/discharge life and capacity preservation of a lithium secondary battery using lithium-manganese composite oxide as a cathode active material for the battery is resulted from an accumulation of dissolved manganese ions ($Mn^{2+}$) from the lithium-manganese composite oxide to the surfaces of an anode and a separator film, respectively. Thus, they have included another anode component, which can be easily reduced, compared with the surface of an anode active material (e.g., a carbonaceous material) having charge/discharge sites in the anode where the conventionally dissolved manganese ions ($Mn^{2+}$) are mainly reduced. Thereby, the present invention was completed.

On the basis of this finding, it is an object of the present invention to provide an anode containing an anode constituting component and a lithium secondary battery comprising the anode.

In accordance with an aspect of the present invention, the above and other objects can be accomplished by the provision of an anode for a battery comprising (a) an anode active material, (b) $TiO_2$, and (c) a styrene-butadiene rubber (SBR).

In accordance with another aspect of the present invention, the above and other objects can be accomplished by the provision of a lithium secondary battery comprising the anode.

DETAILED DESCRIPTION OF PREFERRED EMBODIMENTS

Now, the present invention will be described in more detail.

An anode for a battery in the present invention comprises titanium oxide ($TiO_2$) and styrene-butadiene rubber (SRB) in addition to an anode active material. When co-using the titanium oxide and styrene-butadiene rubber as anode components, a storage performance at high temperatures and life characteristics of a battery using a cathode active material in a spinel-type structure can be improved dramatically. Such a phenomenon can be analogized as in the following, but the present invention is not limited thereto.

The biggest problem in the current battery system is that manganese ions ($Mn^{2+}$) dissolved out from a cathode are reduced at the anode such that a charge/discharge site of the anode active material is blocked by the manganese ions ($Mn^{2+}$). Thus, an electrode resistivity is increased. The titanium oxide ($TiO_2$) used as an anode component leads the reduction site of manganese ions to the $TiO_2$ surface instead of the surface of the anode active material, for example, a carbonaceous material. Thereby, it is predicted that the titanium oxide ($TiO_2$) inhibits increase in resistivity at the carbon surface, which is the charge/discharge site, and deterioration of the battery capacity by the increase in resistivity.

That is, when electrons enter the anode through charging, a material having a relatively higher electric potential among the anode components preserves the electrons preferentially based on a charge profile. Therefore, titanium oxide having an electric potential of about 3.0 to 3.2 V has more excellent electron preservation performances during charging compared with the carbonaceous material having an electric potential of about 0.3 to 0.5 V. As a result, it is assumed that the manganese ions dissolved out from the cathode are moved toward the surface of titanium oxide instead of the carbonaceous material via an electrostatic attraction for the reduction of electrons. For reference, manganese ions dissolved out from the cathode are reduced to manganese at a specified voltage of, for example, 1.87 V or lower. Such a degree of reduction shows a voltage dependency. Accordingly, the titanium oxide leads the manganese ions to the reduction site, thereby the charging/discharging sites in the anode active material may generate intercalation and deintercalation of lithium ions without the interference of accumulated manganese. As a result, continual charging/discharging can be carried out, and prolonged life characteristics and excellent storage performances at high temperatures can be achieved.

Deterioration between electrodes due to a thermal curing of a binder during the high-temperature storage leads to an increase in resistivity between an active material and a current collector, or between active materials, thereby degrades storage performance at high temperatures. PVdF used as a conventional binder is a linear polymer whose long chains are tangled with merely a physical strength. Therefore, the degree of curing during high-temperature storage is large to some extent so that the storage performance at high temperatures is deteriorated. Moreover, such thermal instability leads to one of the reasons to offset the high-temperature storage effect by titanium oxide, which is used together with the binder as anode components.

In contrast, SBR, which is used together with the titanium oxide in the present invention, exists by having each chain bonded chemically. Thus, the degree of thermal curing during the high-temperature storage is small to some extent, and thereby excellent thermal stability may exhibit. Therefore, the excellent thermal stability and adhesion of SBR maximize the high-temperature storage effect by the titanium oxide, so that the synergy effect thereof may exhibit continuously.

In accordance with the present invention, one of anode components is a titanium oxide ($TiO_2$) particle generally known in the art that can be used without limitation. Metal oxides having the similar oxidation potential, for example, $Li_4Ti_5O_{12}$, $SnO_2$, or a mixture thereof can be used.

The titanium oxide having higher electric potential compared with a carbonaceous material may preserve an electric current preferential to the carbonaceous material based on the charge profile. As a result, the titanium oxide may perform its role faithfully as a reduction site of manganese ions dissolved out from the cathode.

There is no particular limit to the particle size of the titanium oxide, but if possible, it is preferable to have a large surface area to increase functions as a reduction site of manganese ions and synergy effect with SBR. For example, titanium oxide may have a particle size in the range of 1 to 500 nm.

The content of the titanium oxide may be suitably controlled in the range for achieving the high-temperature storage effect and capacity enhancing effect of a battery. However, if possible, it is preferable that the content of the titanium oxide is in the range of 1 to 10 parts by weight based on 100 parts by weight of an anode active material such as a carbonaceous material. When the content of the titanium oxide is less than 1 part by weight, a desired improving effect on the high-temperature storage of a battery becomes insignificant. When the content exceeds 10 parts by weight, the use amount of the anode active material is reduced relatively, that leads to deterioration in overall performances of the battery.

In accordance with the present invention, another one of anode components is a styrene-butadiene rubber (hereinafter, referred to as SRB) known in the art that can be used without limitation. The styrene-butadiene rubber, as described above, has a small degree of thermal curing to some extent, thereby it may exhibit excellent thermal stability. Moreover, the styrene-butadiene rubber having a possibility to dissolve or deform inside a battery is advantageously low due to a low impregnation rate with respect to an electrolyte. Particularly, the glass transition temperature (Tg) being lower than or equal to a normal temperature (25° C.) is preferable.

The physical property of the SBR may be easily changed between a glassy state and a rubber state by varying the composition ratio of a styrene-containing monomer and a butadiene-containing monomer. Moreover, hydrophilic functional group-containing monomers may be applied to the SBR easily and variously depending on the content and the kind of the monomer. Thereby, the adhesion effect can be doubled by forming hydrogen bond with the other base materials. Thus, the adhesion between the SBR and the other base materials, for example, electrodes can be improved noticeably. Accordingly, the SBR of the present invention may more preferably include at least one kind of a hydrophilic functional group selected from a group consisting of maleic acid, acrylic acid, acrylate, carboxylic acid, a nitrile group, a hydroxyl group, a mercapto group, an ether group, an ester group, an amide group, an amine group, an acetate group, and a halogen atom.

In accordance with the present invention, the SBR comprising (a) a butadiene-containing monomer and a styrene-containing monomer, or (b) a butadiene-containing monomer, a styrene-containing monomer and a hydrophilic functional group-containing monomer known in the art polymerized according to a polymerization method known in the field of the art can be used. However, the present invention is not limited thereto. There is no particular limit to the hydrophilic functional group-containing monomer, and example thereof include maleic acid, acrylic acid, acrylate, carboxylic acid, a nitrile group, a hydroxyl group, a mercapto group, an ether group, an ester group, an amide group, an amine group, an acetate group, or one or more of the hydrophilic functional group-containing monomers.

Here, the percent by weight ratio of the styrene-containing monomer and the butadiene-containing monomer may vary from 1:99 to 99:1, but not limited thereto. Conventionally, the SBR having the styrene group in a content not exceeding 50% by weight is preferable.

There is no limit to an average molecular weight (MW) of the SBR, but the average molecular weight in the range of 10,000 to 1,000,000 is preferable. The state of the rubber is not particularly limited, but a form of emulsion, in which the rubber is copolymerized into a solution state, is preferable. The SBR may be used in an emulsion form as is or by dispersing it in water. Thus, there is an advantage in that the use of an additional organic solvent or a process for removing the solvent is not required.

The anode, constituting together with the above components, comprises a typical electrode component known in the art, for example, an anode active material.

As the anode active material, a typical anode active material used for the anode of the conventional secondary battery can be used. Examples thereof, without limitation, include lithium metals or lithium alloys, carbon, petroleum cork, activated carbon, graphite, amorphous carbon, metal oxides or lithium adsorptive materials such as other carbonaceous materials, or the like.

In general, the anode active materials used for the lithium secondary battery are classified into a soft carbon having a graphene structure (a structure with a honeycomb-shaped hexagon plane of carbons arranged in stratiform), a hard carbon having the graphene structure mixed with amorphous parts, and a graphite whose crystal structure is completely formed into stratiform as with a natural graphite, and the like. Therefore, the anode active material can be classified into a graphite and soft carbon as a crystalline carbon, and a hard carbon as an amorphous carbon. In the present invention, an amorphous carbon, preferably a hard carbon can be used as a main component of the anode active material. In this regard, there are advantages in that the rate characteristics is excellent and the degradation reaction of a carbonate electrolyte may be reduced.

There is no particular limit to a method for fabricating the anode according to the present invention, but conventional methods known in the art may be used. That is, the anode can be fabricated by preparing an anode slurry including an anode active material, titanium oxide, and SBR, coating the slurry on a current collector, and drying the current collector. Additionally, the titanium oxide may be coated on the surface of the anode active material or coated on the anode surface, which is readily prepared including the SBR, and used.

In accordance with the present invention, there is provided a lithium secondary battery comprising a cathode, an anode including the titanium oxide and SBR, an electrolyte, and a separator film. Examples of the lithium secondary battery, without limitation, include a lithium metal secondary battery, a lithium ion secondary battery, a lithium polymer secondary battery, a lithium ion polymer secondary battery, or the like.

The lithium secondary battery of the present invention may be prepared by conventional methods known in the art, for example disposing a porous separator film between the cathode and anode, followed by introduction of an electrolyte.

The cathode is prepared by conventional methods known in the art, for example, preparing cathode slurry including a cathode active material, coating the slurry on a current collector, and drying the current collector.

As the cathode active material, a cathode active material that can be used in conventional cathodes of a secondary battery may be used. Examples thereof, without limitation, include lithium transition metal composite oxide such as $LiM_xO_y$, in which M is Co, Ni, Mn, or $Co_aNi_bMn_c$, (e.g., lithium manganese composite oxides such as $LiMn_2O_4$, lithium nickel oxide such as $LiNiO_2$, lithium cobalt oxide such as $LiCoO_2$, and moieties of manganese, nickel, and cobalt of these oxides substituted with other transition metal, or lithium-containing vanadium oxides, etc.), or chalcogenide compound (e.g., manganese dioxide, titanium disulfide, molybdenum disulfide, etc.), or the like. Preferable examples include $LiCoO_2$, $LiNiO_2$, $LiMnO_2$, $LiMn_2O_4$, $Li(Ni_aCo_bMn_c)O_2$ (wherein, $0<a<1$, $0<b<1$, $0<c<1$, and $a+b+c=1$), $LiNi_{1-y}CO_yO_2$, $LiCo_{1-y}Mn_yO_2$, $LiNi_{1-y}Mn_yO_2$ (wherein, $0 \leq Y<1$), $Li(Ni_aCo_bMn_c)O_4$ (wherein, $0<a<2$, $0<b<2$, $0<c<2$, $a+b+c=2$), $LiMn_{2-z}Ni_zO_4$, $LiMn_{2-z}Co_zO_4$ (where $0<Z<2$), $LiCoPO_4$ and $LiFePO_4$, or a mixture thereof. Especially, it is advantageous in that the lithium manganese-based cathode active material having a spinel-type structure that dissolves manganese ion out by the high-temperature storage may be used without limitation. Moreover, the lithium secondary battery according to the present invention exhibits excellent rate characteristics required in a power source for cars or the like. Therefore, lithium-manganese oxide has excellent high temperature stability, in addition to having a capability to be used in a great amount as active materials due to the low cost, thus it is more preferable as the cathode active material. Examples of the lithium-manganese oxide, without limitation, include $Li_{1+a}Mn_{2-a}O_4$ (wherein, a is 0 to 0.33), $LiMnO_3$, $LiMn_2O_3$, $LiMnO_2$, $LiMn_{2-a}M_aO_2$ (wherein, M is Co, Ni, Fe, Cr, Zn, or Ta, and a is 0.01 to 0.1), $Li_2Mn_3MO_8$ (wherein, M is Fe, Co, Ni, Cu, or Zn), and $LiMn_2O_4$ having Li moiety substituted with an alkali earth metal. However, the present invention is not limited to these examples, and one or two or more of them may be used in mixtures.

The electrolyte for a battery includes conventional electrolyte components known in the art, for example an electrolyte salt and an organic solvent. The electrolyte salt that can be used is a salt represented by $A^+B^-$, wherein the $A^+$ includes an alkali metallic cations such as $Li^+$, $N^+$ and $K^+$, or a combination thereof, and $B^-$ includes $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$; or a combination thereof. Particularly, a lithium ion is preferable.

As the organic solvent, conventional solvents in the art, for example, a cyclic carbonate and/or a linear carbonate can be used. Examples thereof, without limitation, include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyro lactone (GBL), fluoroethylene carbonate (FEC), formic acid methyl, formic acid ethyl, formic acid propyl, acetic acid methyl, acetic acid ethyl, acetic acid propyl, acetic acid pentyl, propionic acid methyl, propionic acid ethyl, propionic acid butyl, or a mixture thereof. Moreover, a halogen derivative of the organic solvent may also be used.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, vinylene carbonate, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the electrolyte may additionally include carbon dioxide gas.

In addition, in preparing the battery in accordance with the present invention, the porous separator film may be preferably used as the separator film. For example, the separator film may include, but is not limited to, polypropylene, polyethylene and polyolefin based porous separator films. Meanwhile, porous separator films introduced with inorganic particles may also be used.

There is no limit to shapes of the lithium secondary battery in accordance with the present invention, and for example, mention may be made of can-shaped cylinders, squares, pouches or coins.

The lithium secondary battery according to the present invention has excellent low temperature output characteristics, high temperature storage characteristics, rate characteristics and the like. Under the circumstances, the lithium secondary battery may be preferably used as a power source for cars, especially, hybrid electrical cars. However, the present invention is not limited thereto.

Now, the present invention will be described in more detail with reference to the following examples. These examples are provided only for illustrating the present invention and should not be construed as limiting the scope and spirit of the present invention.

EXAMPLE 1

1-1. Preparation of Anode (Preparation of Anode)

97 parts by weight of graphite as an anode active material and 3 parts by weight of titanium oxide were used, and styrene-butadiene rubber (SBR) was added to an N-methyl-2- pyrrolidone (NMP) solvent to obtain anode slurry. Then, the anode slurry was coated on a copper current collector to prepare an anode.

1-2. Preparation of Lithium Secondary Battery (Preparation of Cathode)

$LiMn_2O_4$ was used as a cathode active material, and a conductive material and a binding agent were added to an NMP solvent to obtain cathode slurry. Then, the cathode slurry was coated on an aluminum current collector to prepare a cathode.

(Electrolyte)

A solution of EC/EMC/DEC (volume ratio of 1:2:1) with 1M of $LiPF_6$ added thereto was used as an electrolyte.

(Preparation of Battery)

Between the prepared cathode and anode, polyolefin separator film was disposed. Then, the electrolyte added with an electrolyte additive was introduced therebetween to prepare a battery.

COMPARATIVE EXAMPLE 1

A lithium secondary battery was prepared in the same manner as in Example 1, except that the titanium oxide particles were not used and a PVdF binder was used instead of a SBR.

COMPARATIVE EXAMPLE 2

A lithium secondary battery was prepared in the same manner as in Example 1, except that the titanium oxide particles were not used.

COMPARATIVE EXAMPLE 3

A lithium secondary battery was prepared in the same manner as in Example 1, except that a PVdF binder was used instead of a SBR.

EXPERIMENT EXAMPLE 1

Evaluation of Lithium Secondary Battery

The following experiments were carried out to evaluate the storage performance at high temperatures of the lithium secondary battery comprising the anode according to the present invention.

The lithium secondary battery prepared in Example 1 comprising titanium oxide and SBR was used, and the batteries prepared in Comparative Examples 1 to 3 comprising no component or only one component, respectively, were used as Controls.

Each battery was charged with a current of 0.5 C at a voltage in the range of 3.0 to 4.2 V. The initial capacity of the battery was measured, and then the capacity before/after storing for three days at 65° C. was measured in the following method. The values were compared. The capacity of the battery measured by charging to 0.5 C was discharged by 50%, and 10 C was flown through the battery for 10 seconds. Using the voltage drop during the 10 seconds, cell resistivity was measured. Then, the calculation of the capacity was thus carried out. The results are listed in Table 1.

TABLE 1

|  | Titanium Oxide | Binder | Capacity preservation (%) |
| --- | --- | --- | --- |
| Example 1 | $TiO_2$ | SBR | 92.1% |
| Comparative Example 1 | X | PVDF | 82.8% |
| Comparative Example 2 | X | SBR | 83.2% |
| Comparative Example 3 | $TiO_2$ | PVDF | 84.9% |

As can be seen from Table 1, the battery of Comparative Example 1 prepared in the conventional method without using electrode additives showed about 82.8% capacity preservation after the high-temperature storage. The batteries of Comparative examples 2 and 3 to which $TiO_2$ and SBR were introduced, respectively, exhibited improved high-temperature storage to some extent compared with the battery of Comparative Example 1.

In contrast, the battery of Example 1 to which both titanium oxide and the SBR were introduced according to the present invention was confirmed to have improved capacity preservation of the battery after the high-temperature storage. This proved that by using titanium oxide and styrene-butadiene rubber together as anode components, the high-temperature storage characteristics and life characteristics of the batteries using a cathode active material in a spinel-type structure can be improved dramatically.

INDUSTRIAL APPLICABILITY

As apparent from the above description, by using titanium oxide and SBR as a part of anode components in the lithium secondary battery according to the present invention, increase in the anode resistivity during the high-temperature storage and reduction in the battery capacity by the resistivity are inhibited, thereby the overall performances of the battery can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising a cathode, an anode, an electrolyte and a separator, wherein:
    (I) the cathode comprises a lithium-manganese composite oxide as a cathode active material; and
    (II) the anode comprises:
        (A) an anode active material;
        (B) inorganic particles consisting of $TiO_2$; and
        (C) styrene-butadiene rubber (SBR);
    wherein:
    (1) the $TiO_2$ has a particle size in the range of 1 to 500 nm and is contained in an amount in the range of 1 to 10 parts by weight based on 100 parts by weight of the anode active material;
    (2) the styrene-butadiene rubber (SBR) as anode binder which binds the anode active material and $TiO_2$ comprises a hydrophilic functional group forming a hydrogen bond with anode materials comprising (A) and (B);
    (3) the lithium secondary battery has manganese ions ($Mn^{2+}$), which are dissolved out from the cathode, reduced at a surface of $TiO_2$ instead of the anode active material where lithium is reversibly intercalated/deintercalated, so that the anode resistivity is reduced; and (4) the anode active material is a carbonaceous material.

2. The lithium secondary battery according to claim 1, wherein the styrene-butadiene rubber (SBR) has a transition temperature (Tg) at 25° C. or lower.

3. The lithium secondary battery according to claim 1, wherein the styrene-butadiene rubber (SBR) is a rubber polymerized with a butadiene-containing monomer and a styrene-containing monomer.

4. The lithium secondary battery according to claim 1, wherein the styrene-butadiene rubber (SBR) has an average molecular weight in the range of 10,000 to 1,000,000.

5. The lithium secondary battery according to claim 1, wherein the lithium-manganese composite oxide is at least one selected from a group consisting of $Li_{1+a}Mn_{2-a}O_4$ (wherein, a is 0 to 0.33), $LiMnO_3$, $LiMn_2O_3$, $LiMnO_2$, $LiMn_{2-a}M_aO_2$ (wherein, M is Co, Ni, Fe, Cr, Zn, or Ta, and a is 0.01 to 0.1), $Li_2Mn_3MO_8$ (wherein, M is Fe, Co, Ni, Cu, or Zn), and $LiMn_2O_4$ having Li moiety substituted with an alkali earth metal.

* * * * *